United States Patent
Souza et al.

(10) Patent No.: US 8,357,342 B2
(45) Date of Patent: Jan. 22, 2013

(54) MULTIPHASE MULTIFUNCTIONAL REACTOR

(75) Inventors: Wladmir Ferraz de Souza, Rio de Janeiro (BR); Adriana Moret Borges, Niteroi (BR); Jose Antonio Vidal Vieira, Rio de Janeiro (BR)

(73) Assignee: Petroleo Brasileiro S.A.-Petrobras, Rio de Janeiro (BR)

( * ) Notice: Subject to any disclaimer, the term of this patent is extended or adjusted under 35 U.S.C. 154(b) by 720 days.

(21) Appl. No.: 12/559,944

(22) Filed: Sep. 15, 2009

(65) Prior Publication Data

US 2010/0140143 A1 Jun. 10, 2010

(30) Foreign Application Priority Data

Dec. 5, 2008 (BR) ...................................... 0805341

(51) Int. Cl.
*B01J 8/04* (2006.01)
(52) U.S. Cl. ........ 422/634; 422/642; 422/646; 422/648; 422/215; 422/224
(58) Field of Classification Search .................. 422/630, 422/634, 642, 646, 648, 647, 215, 224
See application file for complete search history.

(56) References Cited

U.S. PATENT DOCUMENTS

| | | | | |
|---|---|---|---|---|
| 3,987,146 A * | 10/1976 | Clay et al. | ................... | 423/239.1 |
| 6,544,409 B2 * | 4/2003 | De Souza | ................... | 208/208 R |
| 6,936,277 B2 * | 8/2005 | Staniforth et al. | ............ | 424/489 |
| 7,153,414 B2 * | 12/2006 | De Souza | ................... | 208/208 R |
| 7,175,755 B2 | 2/2007 | De Souza | | |
| 7,279,145 B2 * | 10/2007 | Balan | ............................ | 422/239 |
| 7,642,365 B2 * | 1/2010 | Balan | ............................ | 549/524 |
| 7,803,270 B2 * | 9/2010 | de Souza et al. | ............... | 208/196 |
| 8,119,083 B2 * | 2/2012 | Shi | ................................ | 422/630 |
| 2006/0131214 A1 | 6/2006 | De Souza et al. | | |

* cited by examiner

*Primary Examiner* — Nina Bhat
(74) *Attorney, Agent, or Firm* — Sughrue Mion, PLLC

(57) ABSTRACT

A multiphase multifunctional reactor, system and method is described which has the capacity to effect extractive oxidation of sulfur and nitrogen compounds and unstable unsaturated compounds that are present in raw hydrocarbon streams, in such a way that the reaction conditions are adjusted and avoid losses of yield of the treated hydrocarbon in the stages of the extraction and/or absorption. The objective is achieved by means of the conception of a reactor which comprises a column divided into five sections which can be classified as two reaction sections (1, 2) two decantation sections (3, 4) and an inert gas section (5) under pressure.

18 Claims, 1 Drawing Sheet

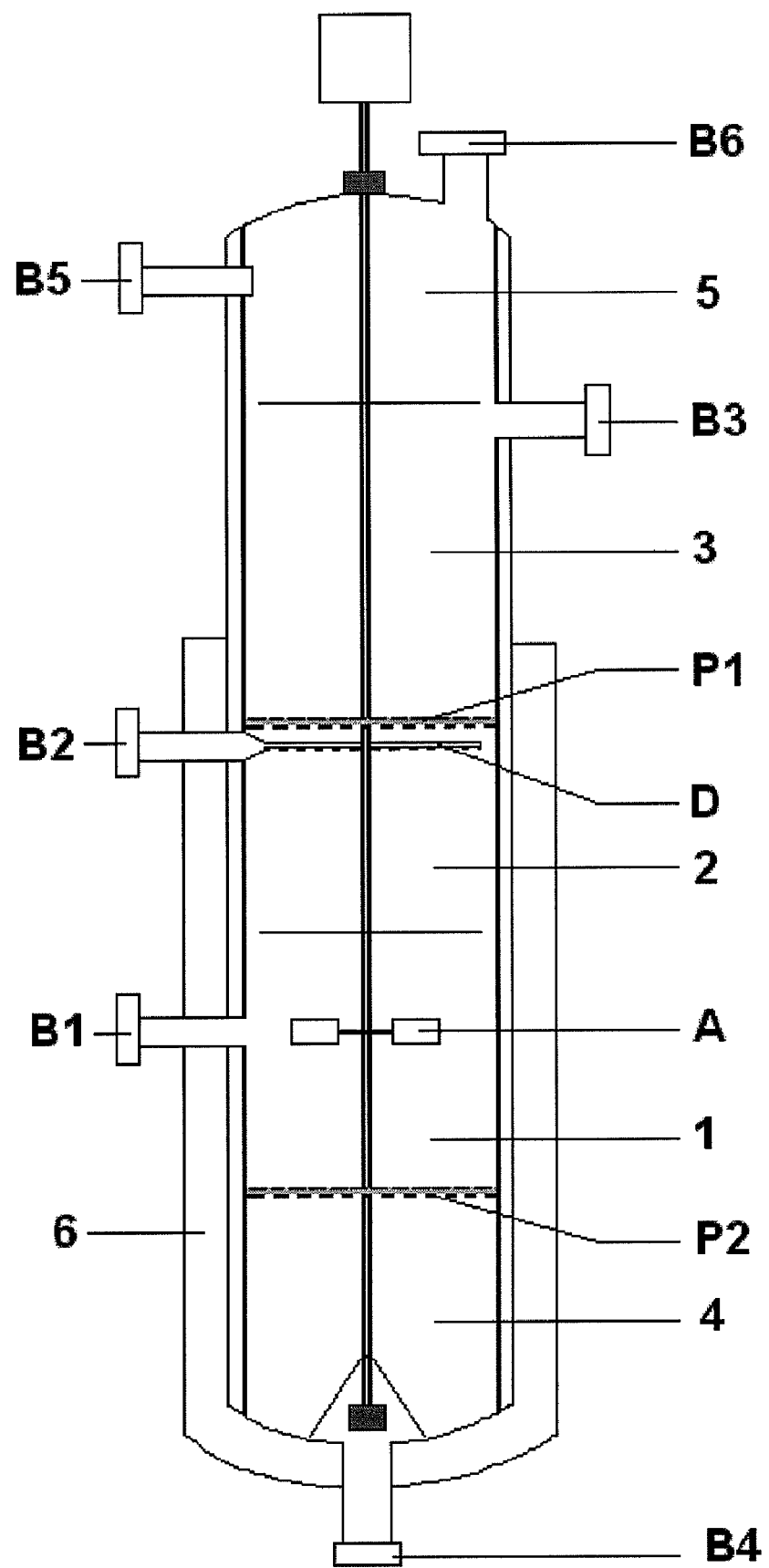

MULTIPHASE MULTIFUNCTIONAL REACTOR

FIELD OF INVENTION

This invention is in the field of equipment for promotion of chemical reactions, more specifically, a reactor which simultaneously carries out the stages of reaction, decanting and extraction necessary for processes of extractive oxidation in raw streams of contaminated hydrocarbons, and systems and methods of using the same.

FUNDAMENTALS OF THE INVENTION

Raw and highly contaminated streams that are rich in heteroatomic polar compounds of fossil oils or from the processing of fossil fuel need to go through treatment and processing before being sold as commercial products.

The treatment and processing of fossil oils can be carried out by extractive oxidation in the presence of a peroxide solution/organic acid couple. It can be applied to hydrocarbon streams to be used as fuels, for removal of sulfur and nitrogen compounds and/or unstable unsaturated compounds of these streams, enabling these streams, for example, to be directed to a process of hydro treatment in which the catalyst used could be deactivated by the nitrogen compounds contained in it.

Oxidation in the presence of this peroxide/acid couple converts the unstable compounds and the natural sulfur and nitrogen contaminants of the hydrocarbon streams into compounds that have a higher polarity and, as a result, have more affinity to polar solvents or to aqueous systems that are relatively immiscible with the hydrocarbon flows. The aim of the treatment is oxidation and removal of the unstable sulfur and nitrogen compounds, or even to make them inert, because there is the possibility of transforming the unstable unsaturated compounds into alcohols that are relatively inert as to the formation of deposits and which, if they remain in the oil phase, can even serve to improve the octane in the event of the treated stream being a naphtha. This treatment comprises, basically, the stages of reaction of oxidation of the unstable sulfur and nitrogen compounds of the raw hydrocarbon flows; followed by a stage of separation of the upper phase of the hydrocarbon, with subsequent neutralization; washing; filtration; drying so as to obtain a treated hydrocarbon phase; and recovery of this hydrocarbon phase, making it appropriate to be directed to any refining process.

For the above stages the following equipment is used:

a reactor destined to receive raw hydrocarbon and the oxidizing solution and to promote all the necessary reactions;

a mixing device (e.g. a mixing tank) in which fresh solutions of peroxide and organic acid are placed in contact for a given time before being introduced into the reactor;

a system of condensation that allows the oxidation reaction to take place in backflow with a non-condensable gaseous phase being discarded;

a decanter to which the oxidized mixture is directed and where an aqueous phase is sent to a system of recovery of the organic acid or is purged as acid water for discarding;

a decantation vessel, in the interior of which the oxidized hydrocarbon is neutralized with an alkaline solution and separated from the brine for discarding by decantation;

a washing vessel in which the hydrocarbon is washed to remove the remaining salts; and a dryer where the hydrocarbon is dried, followed by other stages of processing of production.

In relation to the whole of this procedure set out above, special care is necessary for a very intimate contact to be caused between the aqueous polar solution that contains the oxidizing agent and the hydrocarbon phase that contains the compounds to be oxidized.

The procedure is carried out using a catalyst of iron oxide, such as limonite, which promotes the generation of oxidizing elements in the reacting medium, such as the OH* free radicals and nascent oxygen. Particles of this catalyst can also present the property of interfacial flotation of a certain part of the particles helping the transfer of active elements between the aqueous phase and the oil phase, and increase the rates of reaction of oxidation and/or extraction of the components that are oxidized.

The mechanisms of formation of such radicals also lead to the generation of nascent free oxygen ($O_2$*) in the reaction medium that participates in the oxidation reactions since it has a high oxidizing power. Thus, the reactor almost obligatorily has devices that delay the exit of this free oxygen from the liquid reaction medium. The gases liberated containing this oxygen, together with the portion of fine particles of the catalyst that floats on the oil/aqueous solution interface, form a foam-like region containing the four phases (oil, gas, aqueous liquid and solid particles), where it is believed that there is a high contact surface and consequently greater efficiency of extractive oxidation.

However, the technique above lacks optimizations with a view to better use of the physical and chemical phenomena involved in the reactive and extractive processes. The optimizations aim not only to take better advantage of these phenomena but also to combine them. These optimizations aim:

(i) to improve the efficiency of contact of the phases;

(ii) to take better advantage of the oxidizing gases generated in parallel with the other radicals in the liquid phases; and (iii) to improve separation of the phases within the reactor, which also helps to avoid losses both of the active reaction mixture, to the floating naphtha produced, and also of the active reaction mixture, to the spent oxidizing extraction solution.

RELATED TECHNIQUE

The technique directly related to this present invention is described in the following Brazilian Patent documents, which are all owned by the same applicant as the present application. These documents are briefly discussed below and show the development of the technology involved.

The documents PI 0205814-6 and corresponding U.S. Pat. No. 6,544,409, both of which are hereby incorporated by reference in their entirety, describe the process for the catalytic oxidation of sulfur and nitrogen contaminants and of unsaturated compounds present in a hydrocarbon fossil oil medium, which carries out the oxidation in the presence of at least one peroxide, at least one acid and a pulverized raw iron oxide. The oxidation power derives from the combination of the peroxyacid and the hydroxyl radical generated in the reaction medium due to the presence of an iron oxyhydroxide such as a limonite clay.

The documents PI 0308158-3 and corresponding U.S. Pat. No. 7,153,414, both of which are hereby incorporated by reference in their entirety, also describe a process for upgrading of raw hydrocarbon streams rich in heteroatomic polar compounds and/or unsaturated moieties, involving the extractive oxidation of sulfur, nitrogen and unstable unsaturated compounds, such as, for example, dienes, of these streams, with a peroxide solution and organic acid couple and an iron oxide catalyst, under an acidic pH, atmospheric pressure and temperature, and room temperature or a little higher temperature.

The documents PI 0405642-6 and corresponding U.S. Pat. No. 7,175,755, both of which are hereby incorporated by reference in their entirety, describe a process of extractive oxidation that comprises the treatment of raw hydrocarbon streams by a peroxide solution/organic acid couple, where the percentage by weight of the peroxide solution and organic acid is at least 3%, for both the peroxide and the organic acid, under acidic pH, pressure which can be atmospheric or higher, and temperature which can be room temperature or higher.

The documents PI 0405847-0 and corresponding U.S. Pub. No. 2006/013214, both of which are hereby incorporated by reference in their entirety, like the previous documents, describe a process for extractive oxidation of contaminants in raw fuel streams that are rich in heteroatomic polar compounds and catalyzed by iron oxides contained in natural limonitic goethite, reduced by a stream of hydrogen.

The technology now developed presents a way of optimizing the resources available, proposing a differentiated arrangement of the items of equipment, which provides better efficiency of the process and obtains products with excellent quality.

SUMMARY OF THE INVENTION

The objective of this present invention is a multiphase multifunctional reactor that has the capacity to effect the extractive oxidation of sulfur and nitrogen compounds, and also of unstable unsaturated compounds, that are present in raw hydrocarbon streams, in such a way as to simultaneously optimize the physical-chemical phenomena, that are essential to the reactive and extractive processes combined, and avoid losses of yield.

The objective is achieved through the conception of a reactor (and a reactor system and method of using the same) that comprises a column divided into five sections, which can be classified as two sections of reaction, two sections of decantation and one section of inert gas under pressure. These sections are in such an arrangement that the reaction conditions are in perfect adjustment.

BRIEF DESCRIPTION OF THE DRAWING

In order to describe the manner in which the above-recited and other advantages and features of the invention can be obtained, a more particular description of the invention briefly described above will be rendered by reference to specific embodiments thereof which are illustrated in the appended drawing. Understanding that the drawing depicts only typical embodiments of the invention and is not therefore to be considered to be limiting of its scope, the invention will be described and explained with additional specificity and detail through the use of the accompanying drawing.

The drawing is a representation of one possible physical form of the reactor of this present invention.

It should be noted that the drawing is not drawn to scale. It also should be noted that the drawing is only intended to facilitate the description of embodiments of the present invention.

DETAILED DESCRIPTION OF THE INVENTION

It is to be understood that both the foregoing general description and the following detailed description are exemplary and are intended to provide further explanation of the invention claimed.

The detailed description of the multiphase multifunctional reactor that is the subject of this invention will be given in accordance with the identification of the components that comprise it, based on the drawing described above.

The subject of the present invention is a reactor that has the capacity to cause the extractive oxidation of sulfur and nitrogen compounds as well as unstable unsaturated compounds that are present in raw hydrocarbon streams, in such a way that the reaction conditions are adjusted for the best use of the physical and chemical phenomena and avoid losses of yield of the hydrocarbon treated.

The coherence of the reactions of oxidation within the process of extractive oxidation of contaminants depends strongly on the efficiency of the stages of the process that involve good diffusion of the agents in the reaction medium.

Hence the need to initiate and maximize an intimate contact between the aqueous polar solution that contains the oxidizing agent, comprising hydrogen peroxide and carboxylic acid, both in equilibrium with carboxylic peracid derived from this mixture, and the raw hydrocarbon phase contaminated by the compounds to be oxidized during the treatment.

The reaction mixture typically includes an iron oxide catalyst such as limonite, which is a naturally occurring lateritic concentrated in goethite, which can be used not only as a catalyst, but also to increase the transfer of mass between the immiscible phases.

This catalyst, as well as promoting the generation in the reaction medium of oxygen free radical components, for example, $OH^*$, $OOH^*$, and $O_2^{-*}$, complements the reaction of oxidation via peracid. This catalyst also presents the property of interfacial floatation of a certain portion of particles, which helps the transfer of active components between the aqueous and oil phase, and thus increases the rates of reactions of oxidation and/or extraction of the oxidized components.

The mechanisms of formation of the free radicals also cause the formation of nascent free oxygen ($O_2^{-*}$) in the reaction medium. This nascent free oxygen ($O_2^{-*}$) participates in the reactions of oxidation at the instant when it is generated, and has the property of being highly oxidizing ("singlet oxygen"), and it is useful that it should continue reacting with the reaction medium as long as possible, so as to take the maximum advantage of the oxidizing power.

Depending on the initial boiling point of the load of hydrocarbons, this nascent free oxygen ($O_2^{-*}$), together with a portion of the load of hydrocarbons vaporized, additionally raises the bed of catalyst, which as a consequence forms and stabilizes an oil-aqueous interface with four phases existing simultaneously: liquid hydrocarbon, aqueous oxidizing solution, particles of catalyst, and bubbles of gas that contain hydrocarbon vapor and active oxygen.

The coexistence of these four phases takes the form of a dispersed system similar to a foam, which further accentuates the transfer of active components across the phases.

The adjustment of the reaction conditions is of fundamental importance for the system referred to above to occur.

By its characteristics and constructive quality, this invention provides the necessary adjustments for the reaction and phenomena involved to take place and to provide a final product of excellent quality.

The multiphase multifunctional reactor can be described with the help of the drawing. In the drawing, the reactor, shown in the form of a column, comprises:

a first reaction section (1) in the interior of which the load containing natural heteroatomic and/or unstable contaminant substances, admitted by the entry valve (B1), comes into contact with the oxidizing substances present in an aqueous solution, with particles of catalyst in a given granulometric distribution and concentration, and forms a system of four dispersed phases through, for example, a system of shear agitation (A);

a second reaction section (2) in the interior of which the volume is occupied by the system of four phases, transformed into a foam-like region, of stable reaction conditions, by the elevation that the gaseous phase causes to the particles of the catalyst, which arrange themselves characteristically on the interface between the aqueous and hydrocarbon phases, located immediately above the first reaction section (1) and, at their top, receive an oxidizing aqueous solution admitted and distributed, for example, through a solution nozzle (B2) and a distributor device (D);

a first decantation section (3) located immediately above the second reaction section (2), is separated from the latter by, for example, a first perforated plate (P1), and receives the treated hydrocarbon phase that has lower density than the reaction medium and allows this treated phase to be separated by decantation of the oxidizing aqueous solution remaining from the second reaction section (2) and be withdrawn from the reactor through, for example, a product nozzle (B3), which goes to the units of neutralization and removal of humidity (not shown or referred to);

a second decantation section (4), located immediately below the first reaction section (1), is separated from the latter by, for example, a second perforated plate (P2); this second decantation section (4) has the function of withdrawing the aqueous phase containing the oxidized substances that decant from the first reaction section in the form of organic acid, which is withdrawn from this second decantation section through, for example, an outlet opening (B4) and is conducted for regeneration of the acid for subsequent recycling;

a pressurized inert gas section (5), located immediately above the first decantation section (3), has the purpose of preventing an increase in concentration of gaseous oxygen that has not reacted in the gaseous phase, for reasons of safety, and of keeping the gas generated by the oxidation reaction within the reaction medium for as long as possible, so as to delay the exit of the oxidation gases that are still active, and is a section under pressurization controlled through, for example, the continuous injection of an inert gas through the gas nozzle (B5), depending on the volume occupied by the first decantation section (3); the gases generated are withdrawn through, for example, the gas exit opening (B6) and directed to a system of condensation and subsequent relief;

a heat exchanger system (6) can be installed externally to the reactor in one or more of the region made up of the second reaction section (2), the first reaction section (1) and the second decantation section (4) and serves both to heat these sections and also to cool them when necessary.

The vigorous agitation provided by the agitator (A) in the interior of the first reaction chamber (1) allows the oxidizing substances to come into intimate contact with the load. In relation to the above-described appropriate granulometry and concentration, the average diameter of the particles of catalyst should be less than 250 μm, and preferably less than 150 μm, in concentrations below 40 g/L of load, preferably below 4 g/L of load. In these conditions the concentration of fine particles is sufficient for suspension and interfacial floatation to be possible without having substantial degradation in terms of oxidation component, in this case the peroxide.

The agitation created in the interior of the first reaction section (1) is preferably mechanical, and of the shear type, so as to avoid an axial dispersion, that is, dispersion along the direction of the axis of the agitator (A). This helps to prevent propagation of undesired turbulence in the neighboring sections.

It is preferable that the agitation in the interior of the first reaction section (1), however, should not disturb the interior of the second decantation section (4), where the decantation of the aqueous phase containing the spent oxidizing solution takes place. A second perforated plate (P2), for example, can be installed in the interface between these two sections for prevention of that disturbance.

Also, it is preferable that the agitation caused by the agitator (A) in the interior of the first reaction section (1) should be effected in such a way that a decreasing gradient of turbulence takes place over the length of the immediately superior sections, that is, the second reaction section (2) and the first decantation section (3).

This decreasing gradient of turbulence is classified into:
a maximum amount or level of turbulence in the first reaction section (1) to maximize the content between the load and the oxidizing solution;
a moderate or intermediate level of turbulence in the second reaction section (2) to allow a foam-like consistency to remain in the region, so that the interfacial phenomena caused by the presence of the catalyst and of free oxygen take place and cause an intimate contact between the active components; and
a minimum level, or more preferably an absence, of turbulence in the first decantation section (3), slightly separated by the first perforated plate (P1), where the treated hydrocarbon separates from the aqueous solution.

Generally, the load admitted into the first reaction section by the entry nozzle (B1) is predominantly made up of a stream of hydrocarbons containing the catalyst pulverized in suspension.

The fresh oxidizing solution admitted by the solution nozzle (B2) at the top of the second reaction section (2) comprises a mixture of hydrogen peroxide and an organic acid and, when distributed by the distribution device (D), descends in a uniform manner over the bed of the foam-like interface which contains the four phases that fill the volume of the second reaction section (2), where it begins to come into contact with the catalyst and with the stream of hydrocarbons and, immediately afterwards, continues to flow through the first reaction section (1), where the oxidizing elements are consumed by oxidation of the reactive components of the hydrocarbon stream, with generation of oxidizing gases, heat and hydrocarbon vapors responsible for the stability of the foamy interface.

In the inert gas section (5), the inert gas injected through the gas nozzle (B5) can be nitrogen, and the injection is effected by controlled outflow and pressure and continuously renewed in such a way as not to disturb the laminar region of the liquid surface, in such a way that the gaseous atmosphere above the liquid surface of the interior of the first decantation section (3) does not have explosive characteristics, avoiding contact between hydrocarbon vapors and remaining gaseous oxygen.

The gas nozzle (B6) by which the final gaseous stream can be withdrawn may have a regulator valve (not shown or referenced) so that the internal pressure at the top of the inert gas section (5) shall be greater than or at least equal to 0.02 manometric atmospheres.

The heat exchanger system (6) may be installed internally or externally to the reactor and can be chosen from, for example:
- a first type, such as a sleeve with circulating fluid;
- a second type, with additional characteristics of heat exchange in relation to the first type; and
- a third type, with alternative heat exchange characteristics in relation to the first type.

The heating operation takes place, for example, during the normal operation of the reactor, where the heat exchange system (6) heats up the reaction mixture to keep it at a temperature that does not result in paralysis of the reactions of generation of free radicals and of oxidation of the unsaturated components. These reactions are exothermic, but the heat generated may be insufficient for the reaction activity, since there is loss of heat to the medium and consumption of this heat generated, additionally by endothermic phenomena which take place in the process of extractive oxidation.

It should be pointed out, by way of example, that the phenomena referred to above have the function of:
- supplying heat to certain endothermic reactions that occur simultaneously such as, for example, oxidation of sulfoxides to sulfones via peracid;
- causing the affinity of the fine particles of the catalyst in the oil phase, which is important for the interfacial floatation of these fine particles;
- increasing the solubility of the oxidized substances in the extracting aqueous phase;
- using this heat in cases where the load is a light hydrocarbon, such as, for example, naphtha, to evaporate a portion of the hydrocarbon stream and generate vapor bubbles that contribute to the stabilization of the foam-like region.

The vapor bubbles contain, additionally, heteroatomic and/or unstable substances that could suffer oxidation in a vapor phase by some "singlet" oxygen that dilutes itself in this vapor phase, if these bubbles are maintained for a sufficient time through pressurization.

The operation of cooling by the heat exchanger system (6) can be used for reasons of safety, by the circulation of cooling fluid through its interior to control the temperature of the reaction medium cooling the system in cases of difference of temperature, principally due to an undesired degradation of hydrogen peroxide in the reaction medium.

Although the present invention has been described in its preferred form of realization, the principal concept that orients this present invention, a reactor that has the capacity to promote extractive oxidation of sulfur, nitrogen compounds and also unstable unsaturated compounds that are present in raw hydrocarbon streams, in such a way that the best advantage is taken of the physical and chemical phenomena and that losses of yield of the treated hydrocarbon with oxidizing potential are avoided, remains preserved as to its innovating character, where those well versed in the technique will be able to see and practice variations, modifications, alterations, adaptations and equivalents, applicable and compatible to the working medium in question, without, however, being removed from the coverage range of the spirit and scope of this present invention, which are represented by the claims stated below.

The invention is susceptible to various modifications and alternative means, and specific examples thereof have been shown by way of example in the drawing and are herein described in detail. It should be understood, however, that the invention is not to be limited to the particular devices or methods disclosed, but to the contrary, the invention is to cover all modifications, equivalents, and alternatives falling within the spirit and scope of the claims.

What is claimed is:

1. A multiphase multifunctional reactor for the extractive oxidation of sulfur and nitrogen compounds and unstable unsaturated compounds present in raw hydrocarbon streams to avoid losses of yield of hydrocarbon, comprising:
   - a first reaction section (1), in an interior of which a load containing natural heteroatomic and/or unstable contaminating substances, admitted via an entry nozzle (B1), comes into contact with an oxidizing substance present in an aqueous solution, and with catalyst particles in a given granulometric distribution and concentration, and forms a system of four dispersed phases through a system of shear agitation (A);
   - a second reaction section (2), located immediately above the first reaction section (1), an interior of which is occupied by the system of four dispersed phases, transformed into a foam-like region, which is stable in conditions of reaction, by the lifting of the catalyst particles effected by the gaseous phase, which are disposed characteristically at an interface between the aqueous and hydrocarbon phases, and, at a top of the second reaction section (2), receives an oxidizing aqueous solution admitted and distributed through a solution nozzle (B2) and a distribution device (D);
   - a first decantation section (3), located immediately above the second reaction section (2), and separated therefrom by a first perforated plate (P1), receives a treated hydrocarbon phase that has lower density than the reaction medium and allows this treated phase to separate by decantation from the remaining oxidizing aqueous solution of the second reaction section (2) and to be withdrawn from the reactor through a product nozzle (B3) for neutralization and removal of humidity;
   - a second decantation section (4), located immediately below the first reaction section (1), and separated therefrom by means of a second perforated plate (P2), withdraws the aqueous phase containing the oxidized substances that decant from the first reaction section (1) in the form of organic acid, which is withdrawn from the second decantation section (4) through an exhaustion nozzle (B4) for regeneration of the acid for later recycling;
   - a pressurized inert gas section (5), located immediately above the first decantation section (3) for avoiding an increase in concentration of unreacted gaseous oxygen in the gaseous phase and for maintaining the time period in which the gas generated by the oxidation reaction remains within the reaction medium to delay the exit of the still active oxidizing gases, is under pressurization by the continuous injection of an inert gas through a gas nozzle (B5), depending on the volume occupied by the first decantation section (3), and the gases generated are withdrawn through a gas exit nozzle (B6) for condensation and subsequent relief; and
   - a heat exchanger system (6), installed externally to the reactor in a region comprising the second reaction section (2), the first reaction section (1) and the second decantation section (4), for heating and cooling these sections when necessary.

2. The multiphase multifunctional reactor according to claim 1, wherein the granulometry of the catalyst particles is less than 250 μm and the concentration is below 40 g/L of load, for suspension and interfacial floatation without degradation of the oxidizing component.

3. The multiphase multifunctional reactor according to claim 2, wherein the granulometry of the catalyst particles is less than 150 μm and the concentration is below 4 g/L of load.

4. The multiphase multifunctional reactor according to claim 1, wherein the agitation is mechanical and of the shear type for avoiding axial dispersion and propagation of undesired turbulence in the upper sections of the reactor.

5. The multiphase multifunctional reactor according to claim 1, wherein the agitation caused by the agitator (A) in the interior of the first reaction section (1) decreases in a gradient of turbulence over the length of the immediately superior sections as follows:
   a maximum level of turbulence in the first reaction section (1) for maximizing the contact between the load and the oxidizing solution;
   an intermediate level of turbulence in the second reaction section (2) for maintaining the foam-like region so that the interfacial phenomena created by the presence of the catalyst and of the free oxygen provides intimate contact between the active components; and
   a minimum level of turbulence in the first decantation section (3), where the treated hydrocarbon separates from the aqueous solution.

6. The multiphase multifunctional reactor according to claim 1, wherein there is an absence of turbulence in the first decantation section (3).

7. The multiphase multifunctional reactor according to claim 1, wherein the second perforated plate (P2) at the interface between the first reaction section (1) and the second decantation section (4) prevents a disturbance of the second decantation section (4) where the decantation of the aqueous phase containing the spent oxidizing solution takes place.

8. The multiphase multifunctional reactor according to claim 1, wherein the load admitted in the first reaction section (1) by the entry nozzle (B1) substantially comprises a stream of hydrocarbons containing the catalyst pulverized in suspension.

9. The multiphase multifunctional reactor according to claim 1, wherein the fresh oxidizing solution admitted by the solution nozzle (B2) at the top of the second reaction section (2) comprises a mixture of hydrogen peroxide and organic acid, being distributed by the distributor device (D), descending in a uniform manner over the bed of the foam-like interface which contains the four dispersed phases that fill the volume of the second reaction section (2), coming into contact with the catalyst and with the stream of hydrocarbons and, immediately afterwards, continuing to flow out to the first reaction section (1) where the oxidizing elements are consumed by oxidation of the reactive components of the hydrocarbon stream, with generation of oxidizing gases, heat and hydrocarbon vapors responsible for the stability of the foamy interface.

10. The multiphase multifunctional reactor according to claim 1, wherein the inert gas injected by means of the gas nozzle (B5) comprises nitrogen and the injection is made under controlled outflow and pressure and is continuously renewed.

11. The multiphase multifunctional reactor according to claim 1, wherein the gas nozzle (B6) comprises a regulator valve for maintaining the internal pressure at the top of the inert gas section (5) greater than or equal to 0.02 manometric atmospheres.

12. The multiphase multifunctional reactor according to claim 1, wherein the heat exchanger system (6) is installed internally or externally to the reactor and comprises one or more of:
   a first, sleeve-type element with circulating fluid;
   a second type, with additional heat exchange characteristics in relation to the first type; and
   a third type, with alternative heat exchange characteristics in relation to the first type.

13. The multiphase multifunctional reactor according to claim 1, wherein the heat exchanger system (6) heats the reaction mixture to maintain it at a temperature that does not result in paralysis of the reactions of generation of free radicals and of oxidation of the unsaturated compounds.

14. The multiphase multifunctional reactor according to claim 1, wherein the heat exchanger system (6) circulates cooling fluid in its interior to control the temperature of the reaction medium for cooling the system in cases of the temperature rising due to an undesired degradation of hydrogen peroxide in the reaction medium.

15. A multiphase multifunctional reactor system for the extractive oxidation of sulfur and nitrogen compounds and unstable unsaturated compounds present in raw hydrocarbon streams to avoid losses of yield of hydrocarbon, comprising the following process sections in fluid communication:
   a first reaction section (1), wherein a system of four dispersed phases is formed by contacting a contaminated feed of hydrocarbons with an oxidizing aqueous solution and catalyst particles;
   a second reaction section (2), wherein, at a top of the section, the oxidizing aqueous solution is received and dispersed to treat the hydrocarbon feed and the system of four dispersed phases forms a foam-like region by lifting the catalyst particles;
   a first decantation section (3), wherein the treated hydrocarbon feed from the second reaction section (2) is separated from a remaining oxidizing aqueous solution by decantation and is removed from the reactor;
   a second decantation section (4), wherein the aqueous phase of oxidized substances from the first reaction section (1) is separated by decantation and withdrawn from the reactor; and
   a pressurized inert gas section (5), wherein a pressured inert gas is injected to delay the exit of active oxidizing gases from the reactor and withdraw generated gases.

16. The multiphase multifunctional reactor system according to claim 15, wherein the first reaction section (1) comprises a mechanical agitator.

17. The multiphase multifunctional reactor system according to claim 15, wherein the second reaction section (2) and the first decantation section (3) are separated by a perforated plate.

18. The multiphase multifunctional reactor system according to claim 15, wherein the first reaction section (1) and the second decantation section (4) are separated by a perforated plate.

* * * * *